US008974210B2

(12) United States Patent
Udink et al.

(10) Patent No.: US 8,974,210 B2
(45) Date of Patent: Mar. 10, 2015

(54) PELLETIZING DEVICE

(75) Inventors: Viktor B. Udink, Hoorn (NL); Maurice J. M. Bindels, Amersfoort (NL)

(73) Assignee: CPM Europe B.V., Amsterdam (NL)

( * ) Notice: Subject to any disclaimer, the term of this patent is extended or adjusted under 35 U.S.C. 154(b) by 260 days.

(21) Appl. No.: 13/355,390

(22) Filed: Jan. 20, 2012

(65) Prior Publication Data
US 2012/0189726 A1 Jul. 26, 2012

(30) Foreign Application Priority Data

Jan. 20, 2011 (NL) .................................... 2006036

(51) Int. Cl.
B30B 11/20 (2006.01)
B01J 2/20 (2006.01)

(52) U.S. Cl.
CPC . B01J 2/20 (2013.01); *Y10S 425/23* (2013.01); *Y10S 100/905* (2013.01)
USPC ........ 425/107; 425/191; 425/192 R; 425/331; 425/365; 425/DIG. 230; 384/322; 384/389; 384/391; 384/397; 100/905

(58) Field of Classification Search
CPC ............ B29B 11/228; B29B 9/06; B01J 2/20; B30B 11/201; B30B 11/208; B30B 11/228; Y10S 100/905; Y10S 100/907; Y10S 100/908; Y10S 425/23

USPC ............. 425/107, 331, 191, 192 R, 328, 365, 425/DIG. 113, DIG. 230; 384/322, 389, 391, 384/397, 420; 100/905, 908
See application file for complete search history.

(56) References Cited

U.S. PATENT DOCUMENTS

| 2,075,450 | A | * | 3/1937 | Meakin ........................ 425/173 |
| 2,670,697 | A | | 3/1954 | Meakin |
| 2,700,940 | A | * | 2/1955 | Johnson ........................ 425/136 |
| 2,700,941 | A | * | 2/1955 | Johnson ........................ 366/144 |
| 2,887,718 | A | * | 5/1959 | Curran et al. .................. 264/13 |
| 3,203,366 | A | * | 8/1965 | Lundell ........................ 425/331 |
| 3,841,817 | A | * | 10/1974 | Moldenhauer et al. ........ 425/331 |
| 4,770,621 | A | * | 9/1988 | Groebli et al. ................ 425/150 |
| 4,838,779 | A | * | 6/1989 | Vries ............................ 425/331 |
| 4,979,887 | A | * | 12/1990 | Groebli et al. ................ 425/135 |
| 6,299,430 | B1 | | 10/2001 | Wallace |

* cited by examiner

*Primary Examiner* — Seyed Masoud Malekzadeh
(74) *Attorney, Agent, or Firm* — Peacock Myers, P.C.; Jeffrey D. Myers

(57) ABSTRACT

A pelletizing device comprising a rotary drivable at least partly cylindrical die, wherein the cylindrical part comprises a multitude of radial openings for making of pellets and at least one roller rotatable around a stationary shaft, for pressing of material to be pelletized through the radial openings in the die, wherein the roller is mounted to the corresponding stationary shaft by means of at least one roller bearing and wherein the pelletizing device comprises an oil circulation system for lubricating each of the roller bearings of each of the rollers with oil.

10 Claims, 2 Drawing Sheets

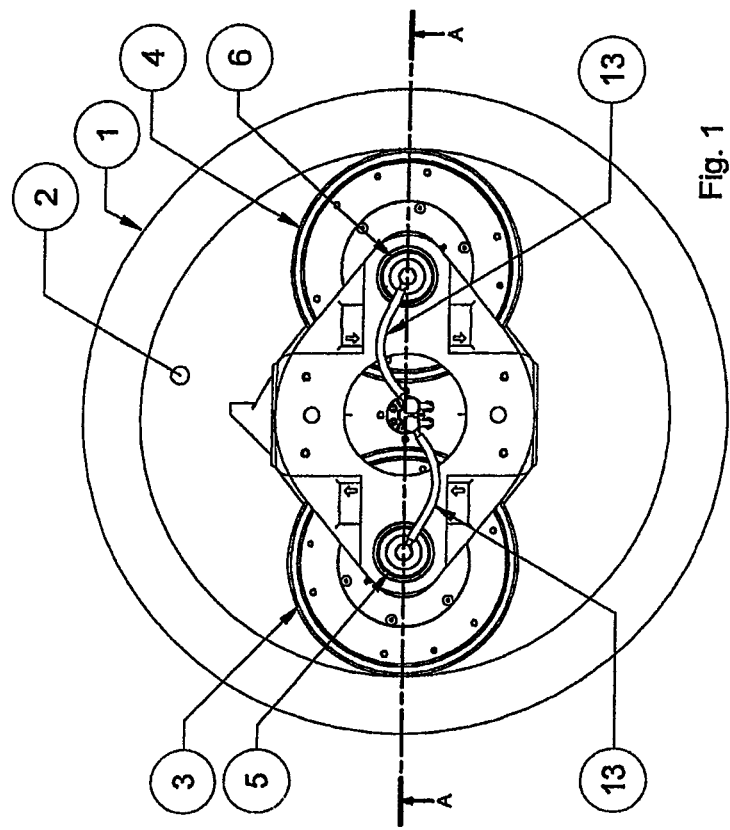
Fig. 1
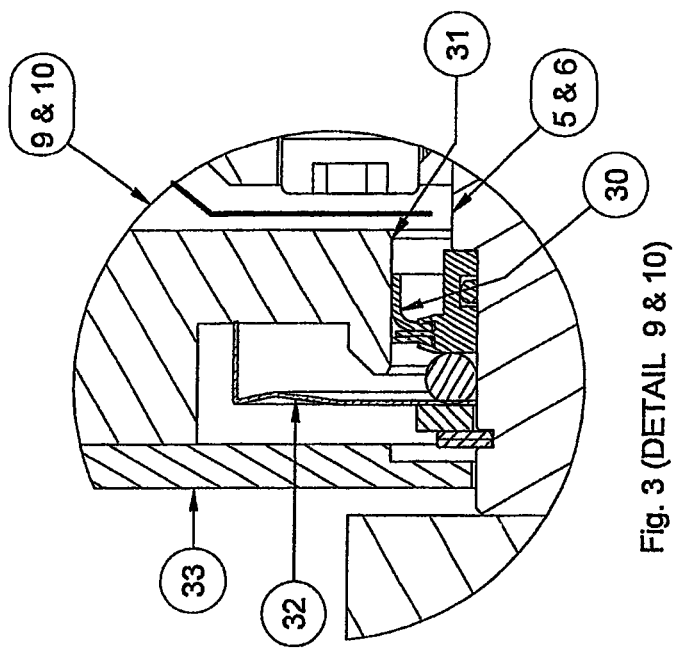
Fig. 3 (DETAIL 9 & 10)

PELLETIZING DEVICE

CROSS-REFERENCE TO RELATED APPLICATIONS

This application is a continuation application of Netherlands Patent Application Serial No. 2006036, entitled "Pelletizing Device", to CPM Europe B.V., filed on Jan. 20, 2011, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The invention relates to a pelletizing device comprising a rotary drivable at least partly cylindrical die that delimits a die cavity, the cylindrical part comprising multiple radial openings for the forming of pellets, at least one roller rotatable around a stationary shaft for pressing the material to be pelletized through the radial openings in the die, wherein the roller is attached to the corresponding stationary shaft by means of at least one rolling baring.

2. Description of Related Art

In many industries products are offered in pellet form. These pellets have the form of large grains or small rods and are produced from originally fine grained material. This material in pellet form can easily be handled, be packaged and transported. Examples of pellets can be found in the cattle food industry, the recycling industry, but also plastics industry.

For example in wood industry sawdust and/or wood chips are being pressed to pellets, that then easily can be packaged and transported, but also be fed properly metered to for instance incinerators.

The forming of pellets takes place in pelletizing devices. Common pelletizing devices comprise a cylindrical die that can be rotary driven. Inside the cylindrical die there is a die cavity. This cylindrical die comprises a multitude of radial openings, through which the material to be pelletized is being pressed from the inside to the outside. The pressing often takes place by a roller that is accommodated inside the cylindrical die. The shaft of the roller is parallel to the shaft of the die but the external diameter of the roller is considerably smaller than the internal diameter of the die. In the die cavity the material to be pelletized is now being poured and the die is being driven. The roller is situated at a predefined minimal distance of the inside of the die and between the roller and the die the material to be pelletized is being compressed into the radial openings in the die. The roller is not driven separately but gets into rotation by the rotation of the die and the material to be pelletized that is situated between the die and the roller. With the most common pelletizing devices there are two rollers inside a die parallel to each other and at a distance to each other and each roller is rotatable around the stationary shaft. The material to be pelletized, e.g., sawdust is being mixed with a small amount of water and if this is desirable a binder to form a pasty substance, that then is being formed to pellets under high pressure in the way described before. The rollers are each fixed to their shaft by means of one or more bearings. A usual way is that each roller is connected to the shaft by two adjacent roller bearings, for instance double-row spherical roller bearings or tapered roller bearings.

During the pressing of pellets large forces are being generated. To generate these forces, the die is rotary driven with considerable power. The large pressing forces that occur are being generated by and transmitted to the rollers and these forces are being led via the bearings to the stationary shafts that have been attached to the pelletizing device by a heavy support construction. To have these bearings functioning under this heavy load a good lubrication is mandatory. This lubrication takes place by means of grease.

This lubricating grease is being pumped with a predefined speed through the bearings because of two reasons. Firstly due to the high load it is necessary that there is a regular supply of new grease. However, secondly the atmosphere in the die cavity, because of the fine material to be pelletized that is present there, is such that this fine material must be prevented from entering the bearings, which would lead to premature failing of the bearings. By regularly pumping the grease through the bearings also possible entering dust is being transported away with the grease and it is being prevented that the dust can penetrate to the raceways of the bearings. It is quite usual for a pelletizing machine that every four hours 1 (one) kilogram of grease is being pressed through the bearings. This is not only a considerable cost-increasing factor in the pelletizing process but also the pressing of grease through the bearings contributes to a temperature increase inside the bearings. In addition the grease eventually can mix with the product, which can be undesirable.

The productivity of a pelletizing device is limited amongst others by the maximum permissible temperature in the bearings in the rollers. In order to achieve higher productivity a larger amount of power needs to be fed to the die. This power is to a large extent being transformed into heat, notably in the bearings of the rollers. Because the grease is pumped through these bearings, all spaces inside the bearings are consequently being filled with grease. This means that the rolling elements in the bearings have to be ploughing continuously through the grease, which increases the resistance and consequently also the temperature. So this is an additional limiting factor to the productivity of the pelletizing device.

BRIEF SUMMARY OF THE INVENTION

The before-mentioned disadvantages are being alleviated by a pelletizing device according to claim 1. Because the roller bearings of the rollers of the pelletizing device comprise an oil circulation system for lubrication by means of oil, not only the above-mentioned disadvantages are being alleviated but in addition additional advantages are being provided. First of all the expensive use of grease is superfluous. Then it is no longer necessary that the roller bearing is completely filled with oil, such that the ploughing of the rolling elements through the oil will not occur or will hardly occur. Consequently there is no or substantially less extra heat being generated. In addition the oil itself can serve as a medium to cool the bearings.

BRIEF DESCRIPTION OF THE SEVERAL VIEWS OF THE DRAWINGS

The invention will now be explained using the description of a non-limiting example of an embodiment of the invention, with reference to the drawings, in which:

FIG. 1 is a schematic representation of a part of a pelletizing device according to the invention;

FIG. 3 is a representation in cross section of an example of an embodiment of a sealing according to the invention.

Figure 2:
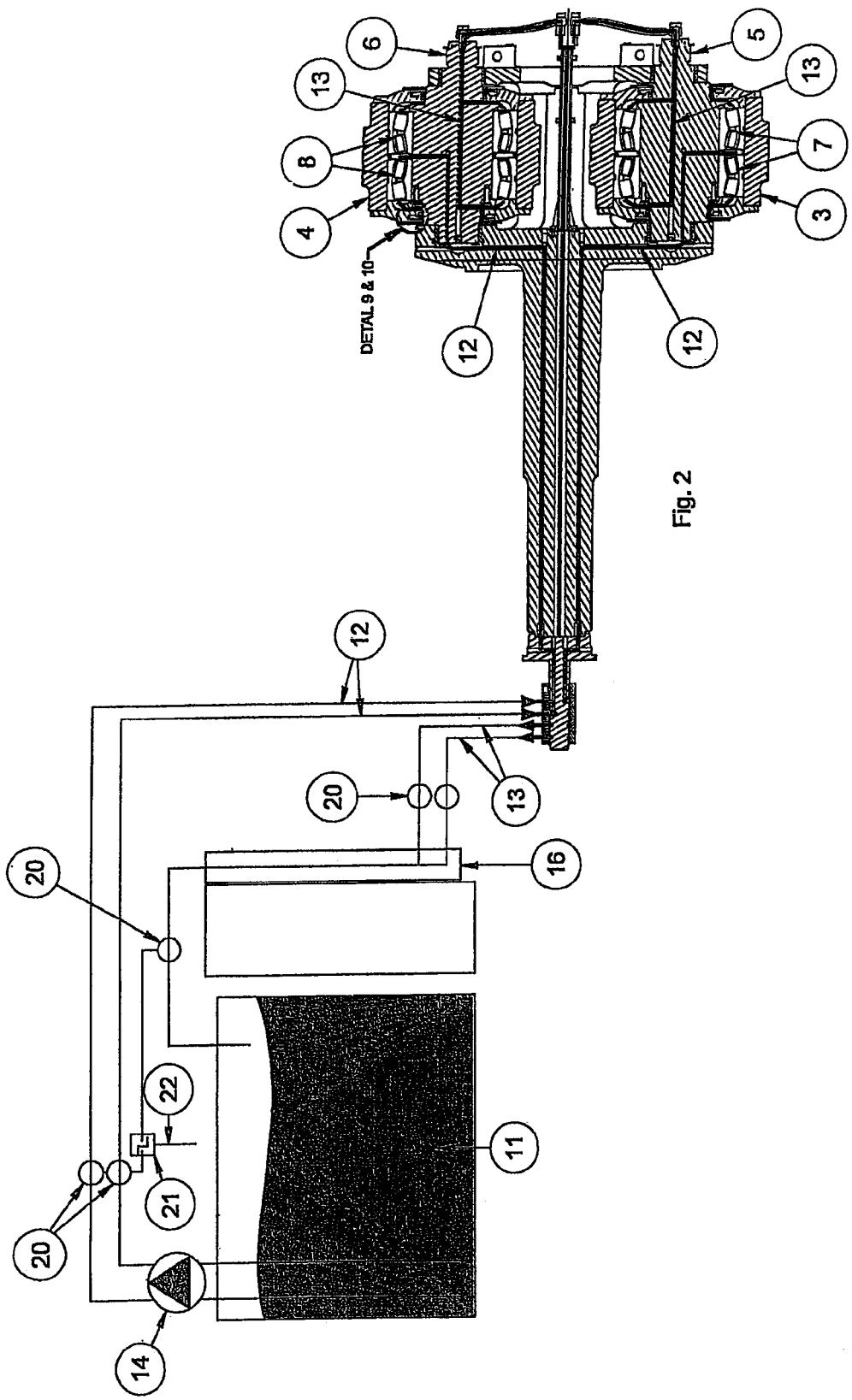
FIG. 2 is a schematic representation of an embodiment of an oil circulation system according to the invention.

| List of reference numbers: | |
|---|---|
| 1 | Die |
| 2 | Die cavity |
| 3 | Roller |
| 4 | Roller |
| 5 | Stationary shaft of 3 |
| 6 | Stationary shaft of 4 |
| 7 | Bearing of 3 |
| 8 | Bearing of 4 |
| 9 | Sealing assembly of 3 |
| 10 | Sealing assembly of 4 |
| 11 | Oil reservoir |
| 12 | Oil supply pipe |
| 13 | Oil return pipe |
| 14 | Oil pump |
| 16 | Oil cooler |
| 20 | Sensor |
| 21 | Control device |
| 22 | Control line |
| 30 | Oil seal |
| 31 | Element connected with roller 3 or 4 |
| 32 | Nylos ring |
| 33 | Sealing shield |

DETAILED DESCRIPTION OF THE INVENTION

In an efficient embodiment at each roller at both axial ends a sealing arrangement has been applied and the oil circulation system comprises an oil pump, an oil reservoir with connected to that a feeding pipe for feeding oil to each of the roller bearings, a return pipe for returning the oil from each of the roller bearings to the reservoir, in which for each bearing the feeding pipe and return pipe will end at the axially different side of the bearing and in which at each roller at both axial ends a sealing has been mounted.

When for each roller the feeding pipe and return pipe are running inside the roller through the corresponding stationary shaft, these pipes can easily be sealed against undesired entry of material from the die cavity.

In most cases a roller will be held on the stationary shaft by two bearings and in that case it is advantageous when the feeding pipe ends between both bearings and therefore the return pipes end at the axial external sides of the bearings. It is also possible to have the direction reversed however that does not have the highest preference as will be further explained below.

As has been mentioned before it is important that dust or other material from the die cavity is prevented from penetrating to the raceways of the bearings. It is also important that it is prevented that oil that has been used for lubrication of the bearings can penetrate in the die cavity. Therefore the sealing between the stationary shaft and the roller respectively the outer ring of the roller bearings that is fixed to the roller has to be very sound. A very reliably functioning sealing assembly is obtained when this at least comprises an oil seal for sealing the oil circulation system and between the oil seal and the die cavity comprises a die cavity sealing to prevent that material from the die cavity get to the oil seal. This makes it possible to obtain a very reliable and long-lasting functioning sealing assembly. Concerning the sealing of the die cavity, depending on the expected operating conditions of the pelletizing device according the invention, the sealing of the die cavity can be selected from a group consisting of: a labyrinth seal, a felt seal, a lip seal with one lip, a lip seal with several lips, and a combination of these. In certain operating conditions the working of the sealing can be further improved when an internal space of the die cavity sealing, such as the labyrinth or a space behind a lip or between lips of the sealing has been filled with grease.

A very reliable sealing assembly is obtained if between the oil seal and the die cavity sealing a Nylos ring has been mounted.

As has been mentioned above it is preferred that, in case there are two roller bearings the supply pipe ends between both bearings. In case that from the outside a contamination penetrates through the sealing, then this contamination is taken away by the oil used for the lubrication and is transported to the oil reservoir. There is a possibility to add a filter in the return pipe to filter this contamination. When the oil flow would have been in the other direction, then the penetrated contamination would be directly transported through the bearing, which is undesirable.

The cooling function of the oil circulation system can be increased by a system comprising an oil cooler. This can prevent the oil reaching too high a temperature, which could drastically reduce the working life of the oil.

In a very advantageous embodiment of the pelletizing devices according to the invention the oil circulation system comprises at least one sensor that has been selected from a group consisting of: a temperature sensor, a pressure sensor, a flow rate sensor and a combination of these, wherein the at least one sensor is connected with a control device. Herewith for instance the temperature in the oil supply and the oil return pipe can be determined. This makes it possible to determine if the power taken up by the bearings has reached a predetermined permissible maximum. If this is not the case, the power fed to the pelletizing device can be increased or the setting of the rollers with respect to the die can be changed, or another operating parameter of the pelletizing device can be adjusted, for instance to increase the productivity. Also pressure sensors in the supply pipe and return pipe can for example be used to detect a possible blockage.

When a predetermined maximum permissible temperature is reached or even surpassed, it is also possible to increase the amount of oil that the oil pump is pumping through the bearings and in this way obtain a larger cooling effect. When this does not have the desired effect, it is obviously also possible to change one of the operating parameters in such a way that the temperature of the returned oil and consequently the temperature of the bearings of the rollers decreases. For instance by decreasing the power fed to the pelletizing device. It will be clear that the control device comprises functionality for controlling the operating parameters. Such control devices belong to the state of the art and do not need to be described in further detail.

FIG. 1 shows a schematic representation of a number of important components in a part of a pelletizing device. It concerns an essentially cylindrical die 1, which in the radial direction encloses die cavity 2. In die cavity 2 there are two rollers 3 and 4. Die 1 can be driven in rotation by a driving device that is not shown in the figure. Rollers 3 and 4 are each rotatable around a stationary shaft 5 and 6. The axes of rotation of rollers 3 and 4 and of die 1 are parallel to each other. Rollers 3 and 4 and their shafts 5 and 6 have been attached to the pelletizing device by a support construction that is not shown. Die 1 comprises a multitude of through openings in the radial direction. When die cavity 2 is filled with a paste of material to be pelletized and when die 1 is driven in rotation, the material to be pelletized will be pressed between rollers 3 and 4 and die 1, which will drive these rollers 3, 4 in rotation around their shafts 5, 6. The material to be pelletized that is pressed between rollers 3, 4 and die 1 will be pressed through the radial openings in die 1 from the die cavity 2 to the external side of die 1. Thus the material to be pelletized will be pressed to pellets, which at the external side of die 1 will be separated and discharged in a way that is further not shown.

For this pelletizing process a considerable amount of energy is needed that is supplied by the drive of die 1. Consumed power of between 200 and 400 kW are common. The pressing process produces considerable radial forces on the rollers 3, 4, which forces are transferred to the stationary shafts 5, 6 of rollers 3, 4.

In FIG. 2 in a schematic way an oil circulation system is shown according to an example of an embodiment of the present invention. Part of FIG. 2 shows a cross section of the plane A-A as is indicated in FIG. 1 and shows the rollers 3, 4 with the respective stationary shafts 5, 6. In FIG. 2 can be seen that the forces applied to rollers 3, 4 are transferred to shafts 5, 6 by means of two spherical roller bearings 7, 8. At both axial ends of rollers 3, 4 respective sealing arrangements 9, 10 are provided, that will be explained in detail below. Further the oil circulation system according to the invention comprises an oil reservoir 11 with oil supply pipes 12, that lead from the oil reservoir 11 to the rollers 3, 4 and are running through stationary shafts 5, 6 and end between both roller bearings 7, 8. Also here for clarity only one of the two rollers is shown. It will be clear that the pipe 12 can be either executed as two pipes, or branches at a certain point to both rollers. In supply pipe 12 an oil pump 14 is comprised. Oil can be pumped from the reservoir 11 through pipe 12 to be discharged between both spherical roller bearings 7, 8. The oil can then flow through these bearings so that these bearings are always properly lubricated. The oil can then transported away at the other side of the bearings, so at both axial ends by return pipes 13 and be returned to the reservoir 11. In this way not only bearings 7, 8 are lubricated but the oil can take up the heat generated in the bearings and transport these away to oil tank 11.

In an embodiment of the oil circulation system according to the invention oil tank 11 also comprises an oil cooling device that is shown schematically in FIG. 2 and is indicated by the reference number 16.

Further in both the supply pipe 12 and return pipe 13 sensors 20 are comprised for measuring the oil temperature, the oil pressure and the flow rate in the supply pipe 12 and the return pipe 13. Sensors 20 are also connected to control device 21. Control device 21 is connected to oil pump 14 as well via control lines 22 with control mechanisms that have not been shown here for controlling operating parameters of the pelletizing device, which will be further explained below.

Control device 21 comprises a memory for storing predetermined threshold values as well as a processor for executing predetermined control algorithms.

This gives the possibility, for example in dependence of measured temperatures by temperature sensors 20 in supply pipe 12 and return pipe 13 of the oil that returns from the rollers 3, 4, to control pump 14 in such a way that when the increase of the oil temperature as measured by the temperature sensors 20 exceeds a certain threshold value, pump 14 will pump a larger amount of oil per time unit through bearings 7, 8 of rollers 3, 4 and thus increase the cooling effect of the oil. It is also possible, depending on the measured temperature, to possibly in connection with the oil flow set by the control device 21, to increase respectively decrease the power that is fed by pelletizing device to die 1. In this way it is possible to operate pelletizing device in such a way that the device always gives an optimum efficiency within predetermined allowable operating conditions. Also it is possible to operate for instance oil cooler 16, when the oil in the return pipe 13 reaches too high temperature, to decrease the temperature of the oil in the reservoir 11 and through this decrease the temperature of the oil that is fed to bearings 7, 8.

The pressures that are measured by the pressure sensors 20 can detect a blockage.

It should be noted that the number and type of sensors are not limited to what is mentioned here as an example. This also holds for the control possibilities that are created with the sensors in an oil circulation system in a pelletizing device according to the present invention. Also measured properties from the oil circulation system can be combined with properties to be measured elsewhere in the device, such as electrical power consumed, etcetera.

In FIG. 3 a part of the sealing 9, 10 is shown at a larger scale by enlarging the part that is indicated with A in FIG. 2. In FIG. 3 can be seen that on the shaft 5, 6 an oil seal 30 is provided that runs against element 31 that is connected in a fixed way with ring 3, 4. Oil seal 30 serves essentially to prevent that oil is leaking from the oil circulation system and can possibly enter the die cavity and get in contact there with the material to be pelletized. Further sealing shield 33 is connected in a fixed way with element 31. Sealing shield 33 forms together with shaft 5, 6 a labyrinth seal 33, 5/6. This labyrinth seal 33, 5/6 forms the first part of the die cavity sealing. This serves to prevent that material from the die cavity, such as the material to be pelletized, can get in contact with the oil seal. The oil seal could possibly be damaged by getting in contact with, e.g., hard material and its oil sealing property could be reduced. Also it should be prevented that at this position undesired material can mix with oil, what eventually could lead to damage for the bearings 7, 8. Nylos ring 32 is connected in a fixed way with shaft 5, 6 and runs against element 31. Nylos ring 32 is also a sealing element and is positioned between oil seal 30 and a labyrinth seal 33, 5/6 and serves in the first place as a second barrier in the die cavity sealing and also forms an extra protection for oil seal 30 against (at most a small quantity of material from the die cavity that could possibly penetrate the labyrinth seal 33, 5/6. Nylos ring 32 on the other hand is also a second barrier for (at most a small quantity) of oil that possibly could penetrate the oil seal 30.

What is claimed is:

1. Pelletizing device comprising:
    a rotary drivable at least partly cylindrical die and within that a die cavity, an axis of rotation of the die being essentially horizontal and the at least one partially cylindrical die comprising multiple radial openings for forming of pellets, and
    at least one roller rotatable around a stationary, essentially horizontal shaft for pressing a material to be pelletized through the multiple radial openings in the at least partially cylindrical die, wherein the at least one roller comprises at both axial ends a sealing assembly and the oil circulation system comprises
        an oil pump
        an oil reservoir, connected to that
        a supply pipe for leading oil to each of the at least on roller bearings, a return pipe for returning oil from each of the at least one roller bearings to the oil reservoir, wherein for each of the roller bearings, the supply pipe and the return pipe end at axially different sides of the respective bearings, wherein the at least one roller is fixed to a corresponding stationary shaft by the roller bearings, wherein the pelletizing device comprises an oil circulation system for lubricating with oil each of the roller bearings of the at least one roller, and wherein, a roller is mounted on the stationary shaft by two respective roller bearings, wherein the supply pipe ends between both such roller bearings and the return pipe ends at axial external sides of the bearings, wherein the sealing assembly at least comprises an oil seal for sealing the oil circulation system and between the oil seal and the die cavity comprises a die cavity seal to prevent that material from the die cavity getting into the oil seal.

2. Pelletizing device according to claim 1, wherein for the at least one each roller the oil supply pipe and the oil return pipe partially run through the corresponding stationary shaft.

3. Pelletizing device according to claim 1, wherein the die cavity seal comprises a seal that is selected from a group consisting of:

a labyrinth seal,
a felt seal,
a lip seal with one lip,
a lip seal with more than one lip, and
a combination of said sensors.

4. Pelletizing device according to claim 3, wherein an inner space of the die cavity seal is filled with grease.

5. Pelletizing device according to claim 1, wherein between the oil seal and the die cavity seal a Nylos ring is mounted.

6. Pelletizing device according to claim 1, wherein the oil circulation system comprises an oil cooler.

7. Pelletizing device according to claim 1, wherein the oil circulation system comprises at least one sensor that is selected from a group consisting of:

a temperature sensor,
a pressure sensor,
a flow rate sensor, and
a combination of said sensors.

8. Pelletizing device according to claim 7, wherein the at least one sensor is connected with a control device.

9. Pelletizing device according to claim 7, wherein the oil pump can be controlled in dependency on at least one measured sensor value.

10. Pelletizing device according to claim 7, wherein an operating parameter of the pelletizing device can be controlled in dependency on at least one measured sensor value.

* * * * *